United States Patent
Sung et al.

(10) Patent No.: US 10,893,562 B1
(45) Date of Patent: Jan. 12, 2021

(54) DYNAMIC SHARING OF SECONDARY CARRIER AMONG MULTIPLE PRIMARY CARRIERS IN DUAL-CONNECTIVITY SERVICE

(71) Applicant: Sprint Spectrum L.P., Overland Park, KS (US)

(72) Inventors: Sanghoon Sung, Ashburn, VA (US); Yun Sung Kim, Ashburn, VA (US); George W. Harter, III, Ashburn, VA (US); Udit Thakore, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/356,976

(22) Filed: Mar. 18, 2019

(51) Int. Cl.
*H04W 76/15* (2018.01)
*H04W 28/02* (2009.01)

(52) U.S. Cl.
CPC ....... *H04W 76/15* (2018.02); *H04W 28/0278* (2013.01); *H04W 28/0284* (2013.01); *H04W 28/0289* (2013.01)

(58) Field of Classification Search
None
See application file for complete search history.

(56) References Cited

U.S. PATENT DOCUMENTS

| | | | | |
|---|---|---|---|---|
| 5,835,716 A * | 11/1998 | Hunt | ...................... | G06Q 10/02 709/213 |
| 6,625,777 B1 * | 9/2003 | Levin | ................... | H04L 1/0009 714/751 |
| 2004/0008643 A1 * | 1/2004 | Guturu | .................. | H04W 76/10 370/329 |
| 2008/0056334 A1 * | 3/2008 | Suh | ........................ | H04W 28/22 375/132 |
| 2014/0145896 A1 * | 5/2014 | Bi | ............................ | H01Q 5/42 343/844 |
| 2015/0092573 A1 * | 4/2015 | Zhang | ................... | H04W 24/10 370/252 |
| 2016/0227558 A1 * | 8/2016 | Jain | ........................ | H04W 48/18 |
| 2017/0135071 A1 * | 5/2017 | Sundberg | ................ | H04W 4/00 |
| 2019/0052582 A1 * | 2/2019 | Gaal | ..................... | H04L 1/1887 |
| 2019/0230551 A1 * | 7/2019 | Vikberg | ............ | H04W 28/0268 |
| 2019/0373523 A1 * | 12/2019 | Panchal | ................ | H04W 48/12 |

(Continued)

FOREIGN PATENT DOCUMENTS

EP 3633870 A1 * 8/2020

*Primary Examiner* — Ayaz R Sheikh
*Assistant Examiner* — Faiyazkhan Ghafoerkhan (57) ABSTRACT

A cell site that has multiple first-RAT carriers will monitor a capacity demand respectively of each first-RAT carrier, with capacity demand representing an extent to which adding more service capacity could be useful in view of the state of service on the 4G carrier. Further, the cell site will dynamically allocate resources of a second-RAT carrier for use in dual-connectivity service of UEs served on various ones of the first-RAT carriers, with the allocation being based on the capacity demands of the various primary-RAT carriers. For instance, if a first first-RAT carrier has a higher capacity demand than a second first-RAT carrier, then the cell site could allocate a more resources of the secondary-RAT carrier for use in dual-connectivity service of UEs served on the first first-RAT carrier than for use in dual-connectivity service of UEs served on the second first-RAT carrier.

20 Claims, 4 Drawing Sheets

(56) References Cited

U.S. PATENT DOCUMENTS

| 2020/0068639 A1* | 2/2020 | Kim | H04W 76/16 |
| 2020/0099560 A1* | 3/2020 | Li | H04W 16/06 |
| 2020/0169926 A1* | 5/2020 | Hwang | H04W 36/0079 |
| 2020/0260324 A1* | 8/2020 | Byun | H04W 4/40 |

* cited by examiner

DYNAMIC SHARING OF SECONDARY CARRIER AMONG MULTIPLE PRIMARY CARRIERS IN DUAL-CONNECTIVITY SERVICE

BACKGROUND

A cellular wireless network typically includes a number of base stations that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each base station could be coupled with a core network that provides connectivity with various application servers and/or transport networks, such as the public switched telephone network (PSTN) and/or the Internet for instance. With this arrangement, a UE within coverage of the cellular network could engage in air interface communication with a base station and could thereby communicate via the base station with various application servers and other entities.

Such a network could operate in accordance with a particular radio access technology (RAT), with communications from the base stations to UEs defining a downlink or forward link and communications from the UEs to the base stations defining an uplink or reverse link.

In accordance with the RAT, each base station could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each such carrier could be structured to define various physical channels for carrying information between the base stations and UEs.

Over the years, the industry has embraced various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

OVERVIEW

When a UE enters into coverage of an example network, the UE could detect threshold strong coverage of a base station (e.g., a threshold strong reference signal broadcast by the base station) on a particular carrier and could then engage in random-access and Radio Resource Control (RRC) signaling to establish an RRC connection through which the base station will serve the UE on that carrier.

Further, if the UE is not already registered for service with the core network, the UE could transmit to the base station an attach request, which the base station could forward to a core-network controller for processing. And the core-network controller could then coordinate setup for the UE of one or more bearers extending between the UE and a core-network gateway that provides transport-network connectivity.

Once the UE is so connected and registered, the base station could then serve the UE in a connected mode on the carrier, managing downlink air-interface communication of packet data to the UE and uplink air-interface communication of packet data from the UE. For example, when packet data for the UE arrives at the core network from a transport network, the data could flow to the UE's serving base station, and the base station could then schedule and provide transmission of that data to the UE on particular downlink air-interface resources of the carrier. Likewise, when the UE has data to transmit on the transport network, the UE could transmit a scheduling request to the base station, the base station could responsively schedule transmission of that data from the UE on particular uplink air-interface resources of the carrier, and the UE could accordingly transmit the data to the base station for forwarding through the core network to the transport network.

As the industry advances from one generation of wireless technology to the next, networks and UEs may also support simultaneous connectivity on connections according to multiple different RATs.

With the transition from 4G to 5G, for instance, it is expected that networks and UEs will be configured to support connections according to both RATs concurrently, with an arrangement referred to as EUTRA-NR Dual Connectivity (EN-DC). To facilitate this, a cell site could be configured to provide a coverage area on both 4G and 5G, with a 4G base station providing service on one or more 4G carriers and a 5G base station providing service on at least one 5G carrier. Further, a UE could include both a 4G radio that establishes a 4G connection on a 4G carrier and a 5G radio that establishes a 5G connection on a 5G carrier. Thus, when the UE is in the coverage area, the UE could establish a 4G connection and a 5G connection and could be served with packet-data communications on those two connections concurrently, with a portion of data flowing over the UE's 4G connection and another portion of the data flowing over the UE's 5G connection.

More generally, dual-connectivity service of a UE could involve the UE having co-existing connections according to multiple different RATs and being served with packet-data communication concurrently on those multiple different-RAT connections. This is to be distinguished from stand-alone (or single-connectivity) service of a UE, where the UE is served with packet-data communication according to just a single RAT, such as with just a 4G connection or just a 5G connection for instance.

Dual-connectivity can thus leverage and/or facilitate transition of a network from one RAT to another. Further, dual connectivity can help to provide UEs with increased peak data rate by multiplexing packet-data onto multiple concurrent connections. Dual-connectivity could thus be desirable for a UE that is or will be engaged in high-throughput communication.

With dual-connectivity service, one RAT could be deemed the primary RAT, and the other RAT could be deemed the secondary RAT. For instance, with EN-DC, 4G could be deemed the primary RAT, and 5G could be deemed the secondary RAT. With this arrangement, when the UE is within coverage of a cell site that provides service on both the primary RAT and the secondary RAT, the UE could initially search for and discover coverage on the primary RAT and establish a connection with the cell site on a carrier of that primary RAT. Further, once the UE is so connected, the cell site could then engage in a process to add for the UE an additional connection with the cell site on the secondary RAT. And the cell site could then provide the UE with dual-connectivity service by serving the UE concurrently on the UE's primary-RAT connection and the UE's secondary-RAT connection.

One technological issue that can arise in this arrangement is that the cell site might have multiple carriers on the primary RAT but fewer carriers on the secondary RAT. In that situation, as UEs connect with the cell site on the various carriers of the primary RAT, at issue is how to allocate secondary-RAT carrier resources for use in dual-connectivity service of those UEs. In particular, considering a given secondary-RAT carrier, at issue is how to allocate resources of that secondary-RAT carrier for use in dual-connectivity service of UEs served on various ones of the primary-RAT carriers. For instance, if the cell site has carriers A, B, and C on the primary RAT and carrier D on the secondary RAT, at issue may be how to allocate use of air-interface resources of carrier D for use in dual-connectivity service of UEs that are served on various ones of carriers A, B, and C.

Disclosed herein is a mechanism to help address this issue.

In accordance with the disclosure, a cell site that has multiple primary-RAT carriers will monitor a capacity demand respectively of each of the primary-RAT carriers, with capacity demand representing an extent to which adding more service capacity could be useful in view of the state of service on the 4G carrier. And the cell site will dynamically allocate resources of a secondary-RAT carrier for use in dual-connectivity service of UEs served on various ones of the primary-RAT carriers, with the allocation being based on the capacity demands of the various primary-RAT carriers. For instance, if a first first-RAT carrier has a higher capacity demand than a second first-RAT carrier, then the cell site could allocate a more resources of the secondary-RAT carrier for use in dual-connectivity service of UEs (i.e., of any one or more UEs) served on the first first-RAT carrier than for use in dual-connectivity service of UEs (i.e., of any one or more UEs) served on the second first-RAT carrier.

The cell site could carry out this dynamic allocation in the time domain, in the frequency domain, and/or in another manner. For example, if the resources of the secondary-RAT carrier are defined in time intervals, the cell site could reserve more of those time intervals of resources of the secondary-RAT carrier for use in dual-connectivity service of UEs that are served on a primary-RAT carrier that has higher capacity demand than for UEs that are served on a primary-RAT carrier that has a lower capacity demand. And in addition or alternatively, if the resources of the secondary-RAT carrier are defined in frequency ranges, the cell site could reserve more of those frequency ranges for use in dual-connectivity service of UEs that are served on a primary-RAT carrier than has higher capacity demand than for UEs that are served on a primary-RAT carrier that has a lower capacity demand.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of EN-DC service. In particular, the example implementation will be described in the context a cell site that provides a coverage area on both 4G LTE and 5G NR, and where at least some UEs served by the cell site are EN-DC capable. It should be understood, however, that the principles disclosed herein could extend to apply in other scenarios as well, such as with respect to other RATs. Further, variations from the specific arrangements and processes described are possible. For instance, various described entities, connections, functions, and other elements could be added, omitted, distributed, re-located, re-ordered, combined, or changed in other ways.

Figure 1:
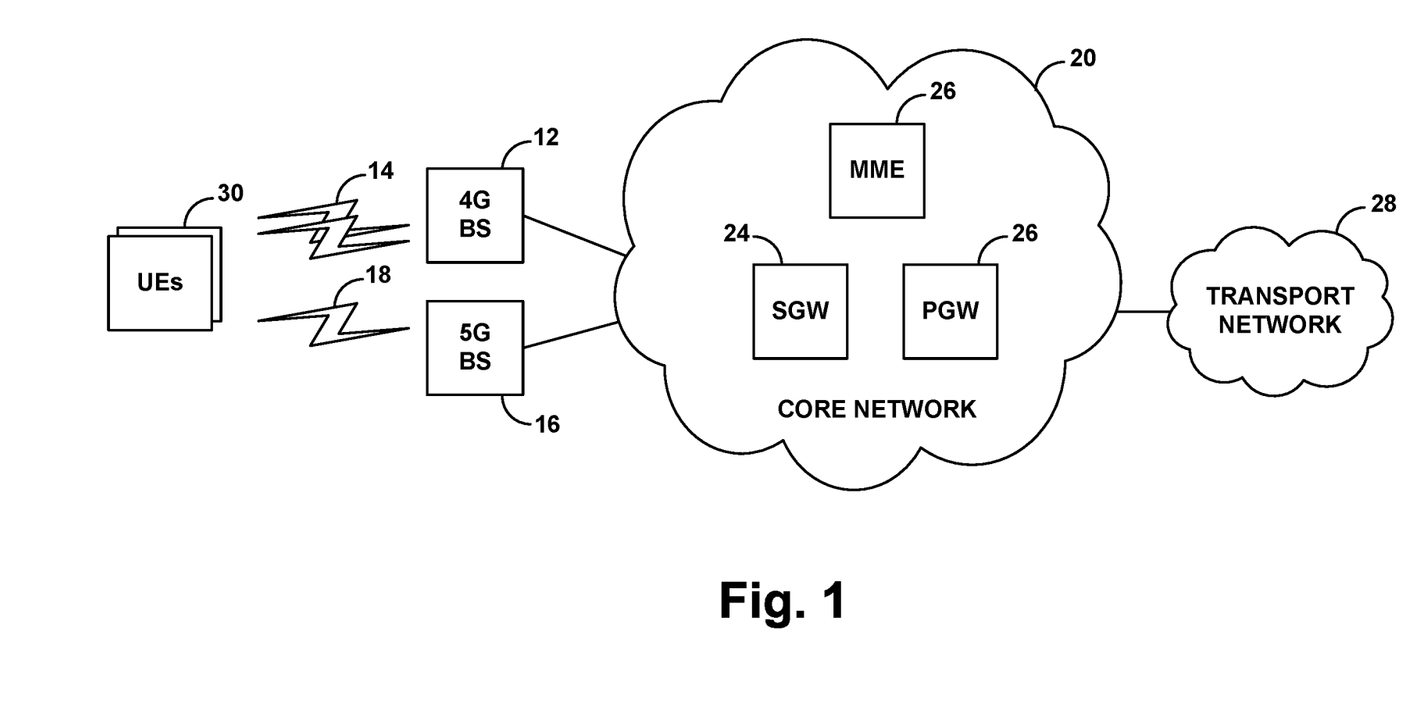
FIG. 1 is a simplified block diagram of an example network arrangement in which features of the present disclosure can be implemented.

FIG. 1 depicts an example network having a cell site that includes a 4G base station (e.g., evolved Node-B (eNB)) 12 that is configured to provide 4G service on each of a plurality of 4G carriers 14, and a 5G base station 16 that is configured to provide 5G service on at least one 5G carrier 18. These base stations could be collocated with each other at the cell site and could provide coverage in largely the same direction as each other, to define a coverage area in which UEs can receive both 4G service and 5G service.

The 4G service and 5G service could differ from each other in various ways now known or later developed, such as with one implementing variable subcarrier spacing and the other having fixed subcarrier spacing, with one having flexible TDD configuration and the other having fixed TDD configuration, with one having different symbol time segments than the other, and/or with one making different use of MIMO technologies than the other, among other possibilities.

In representative 4G and 5G implementations, each carrier could be FDD or TDD and could thus define separate downlink and uplink frequency channels or a single frequency channel multiplexed over time between downlink and uplink use. In any event, each frequency channel of a carrier could be characterized by a defined frequency bandwidth (width in radio-frequency (RF) spectrum) and center frequency and may have a unique carrier identifier.

The air interface provided by a given 4G or 5G carrier could be divided over time into frames, subframes, timeslots, and symbol time segments, and over frequency into subcarriers, thus defining an array of air-interface resource elements in which subcarriers can be modulated to carry data. Further, in each subframe, timeslot, or the like, the resource elements could be divided into groups defining physical resource blocks (PRBs), which the base station could allocate for use to carry data to or from served UEs.

As further shown, the example 4G and 5G base stations are both connected with a common core network 20, such as an Evolved Packet Core (EPC) network or Next Generation Core (NGC) network. In the example shown, the core network includes a serving gateway (SGW) 22, a packet data network gateway (PGW) 24, and a mobility management entity (MME) 26, but other arrangements are possible as well.

In one of various possible EN-DC implementations, without limitation, the 4G base station and 5G base could each have an interface with the SGW, the SGW could have an interface with the PGW, and the PGW could provide connectivity with a transport network 28. Further, the 4G base station could have an interface with the MME, and the MME could have an interface with the SGW, so that the MME could coordinate setup of bearer connections for a UE to enable the UE to engage in packet-data communication via 4G and 5G. With this arrangement, the 4G base station could operate as an anchor node for control signaling with the MME for both 4G and 5G connections, and the 5G base station could operate to provide secondary connectivity for served UEs.

FIG. 1 further depicts example UEs 30 that may concurrently or from time to time be within the coverage area of the 4G and 5G base stations. In a representative implementation, all of these UEs are configured with a 4G radio and associated components to establish a 4G connection with the 4G base station and to be served according to 4G over that connection. And at least some of the UEs are also configured with a 5G radio and associated components to establish a 5G connection with the 5G base station and to be served according to 5G over that connection, supporting EN-DC service.

As each such UE initially enters into coverage of the cell site, the UE could scan and detect coverage of the 4G base station on one of the 4G carriers and the UE could engage in signaling with the 4G base station to establish a 4G RRC connection on that 4G carrier. In addition, if appropriate, the UE could then engage in attach signaling with the MME via the UE's 4G connection, and the MME could set up one or more bearers for the UE to enable the UE to engage in packet-data communication over the UE's 4G connection.

Further, the 4G base station could establish for the UE a context record and could store in the UE context record various connection, service, and capabilities data for the UE. For instance, the 4G base station could store in the context record an identifier of the UE's established 4G connection and an identifier of the 4G carrier on which the UE is connected.

Once the UE is connected with the 4G base station on the 4G carrier, the 4G base station could serve the UE with packet-data communications. For instance, when the 4G base station receives packet-data for transmission to the UE, the 4G base station could buffer the data pending transmission, and the 4G base station could select downlink PRBs in an upcoming subframe on the 4G carrier to carry at least a portion of the data to the UE and could schedule and provide transmission of the data to the UE on those PRBs. And when the UE has packet-data for transmission to the 4G base station, the UE could buffer the data pending transmission, the UE could send to the 4G base station a scheduling request including a buffer status report (BSR) indicting the amount of data currently buffered, the 4G base station could select uplink PRBs on the 4G carrier when available to carry at least a portion of the data from the UE and could schedule that transmission, and the UE could accordingly transmit the data to the base station on those PRBs.

Further, if the UE supports EN-DC service, the 4G base station could also coordinate setup of EN-DC service for the UE. To do so, the 4G base station could direct the UE to scan for coverage on 5G carrier 18, and the UE could responsively report to the 4G base station that the UE detects threshold strong coverage of 5G base station 16 on 5G carrier 18. Given this, the 4G base station could then engage in inter-base-station signaling with the 5G base station to arrange for setup of a 5G RRC connection on the 5G carrier between the 5G base station and the UE, and the 4G base station could further coordinate or engage in signaling with the MME to trigger setup for the UE of a split bearer, so that the UE's packet-data communication can then be multiplexed between the UE's 4G connection and the UE's 5G connection.

With EN-DC service so set up, when the core network had packet-data to transmit to the UE, a portion of the data could flow to the 4G base station and the 4G base station could schedule and provide transmission of that portion of the data over the UE's 4G connection to the UE as discussed above, and another portion of the data could flow to the 5G base station and the 5G base station could similarly schedule and provide transmission of that other portion of the data over the UE's 5G connection to the UE. Optimally, transmission of these portions of data could occur concurrently over the 4G and 5G connections, with downlink 4G PRBs of the 4G carrier carrying one portion, and with downlink 5G PRBs of the 5G carrier carrying the other portion. The UE could thus receive the transmissions on both connections concurrently and could then reassemble the portions and process the data transmission.

Likewise, when the UE has data to transmit, the 4G base station could schedule transmission of a portion of the data over the UE's 4G connection to the 4G base station and the UE could accordingly engage in that transmission as discussed above, and the 5G base station could similarly schedule transmission of another portion of that data over the UE's 5G connection to the 5G base station and the UE could accordingly engage in that transmission. Optimally here too, transmissions of these portions could occur concurrently, with uplink 4G PRBs of the 4G carrier carrying one portion, and with uplink 5G PRBs of the 5G carrier carrying the other portion. And the portions could then be combined at one of the base stations or in the core network for processing.

Because UEs could connect with the 4G base station on various ones of the 4G carriers, in practice the cell site could end up serving various UEs on different ones of the 4G carriers. For instance, if cell site operates on 4G carriers A, B, and C, some UEs might connect with and be served on 4G carrier A, other UEs might connect and be served on 4G carrier B, and still other UEs might connect and be served on 4G carrier C. Further, to the extent such UEs support EN-DC service, the cell site could also establish a secondary connection for each such UE on 5G carrier 18.

As noted above, at issue in this scenario is how to share resources of the 5G carrier for EN-DC service among the various 4G carriers. For instance, considering the example 4G carriers A, B, and C noted above, at issue may be what extent of the 5G-carrier resources to allocate for service of UEs that are served concurrently on 4G carrier A, what extent of the 5G-carrier resources to allocate for service of UEs that are served concurrently on 4G carrier B, and what extent of the 5G-carrier resources to allocate for service of UEs that are served concurrently on 4G carrier C.

In practice, the 5G base station could be responsible for allocating use of the air-interface resources of the 5G carrier. Therefore, the 5G base station could be the entity that faces and addresses this issue. For instance, a resource scheduler of the 5G base station could face this issue when working to allocate PRBs of the 5G carrier among UEs that are receiving EN-DC service on the 5G carrier together with various ones of the 4G carriers. Alternatively, one or more other entities could face and address this issue.

As noted above, the present disclosure provides for dynamically resolving this issue based on an evaluation of capacity demand respectively of the 4G carriers, with capacity demand representing an extent to which adding more service capacity could be useful in view of the state of service on the 4G carrier. For instance, the 5G base station could reserve more resources of the 5G carrier for use in EN-DC service of UEs that are served on a 4G carrier that has higher capacity demand than for use in EN-DC service of UEs that are served on a 4G carrier that has lower capacity demand. To facilitate this, the cell site could regularly monitor the capacity demand respectively of each of its 4G carriers and could proportionally allocate resources of the 5G carrier in accordance with the relative capacity-demand measures of the various 4G carriers.

Here, the capacity demand of a given 4G carrier could be defined based on one or more factors.

For example, the capacity demand of a 4G carrier could be defined based on data rate on the 4G carrier, such as the quantity of useable bearer data communicated on the carrier per unit time (e.g., excluding forward-error-correction data, retransmissions, or the like), with lower data rate corresponding with higher capacity demand, and higher data rate corresponding with lower capacity demand.

In practice, data rate of communications on a given carrier could relate to the quality (e.g., strength) of coverage of the UEs engaging in the communication, as lower-quality coverage could result in communication using a lower-order modulation and coding scheme (MCS) that provides a lower data rate, and higher-quality coverage could result in communication with a higher-order MCS that provides a higher data rate. Further, other factors may contribute to the resulting data rate of communications on given carrier.

The cell site could monitor data rate on each 4G carrier as an average data rate or other statistical measure of data rate of communications on the carrier over a recent sliding window of time. And the cell site could be configured with a mapping table or other mapping data that correlates various measures of data rate to associated measures of capacity demand, defining an inversely-proportional relationship between data rate and capacity demand. Thus, on at least this basis, the cell site could deem a 4G carrier that has been carrying data with a lower data rate to have higher capacity demand, and the cell site could deem a 4G carrier that has been carrying data with a higher data rate to have a lower capacity demand.

As another example, the capacity demand of a 4G carrier could be defined based on the extent of data buffered for transmission on the carrier, such as the quantity of data buffered for downlink and/or uplink transmission over a recent sliding window of time, with a greater extent of data buffered corresponding with a higher capacity demand, and a lesser extent of data buffered corresponding with a lower capacity demand.

The cell site could monitor amount of data buffered for transmission respectively on each 4G carrier on the downlink and/or the uplink as an average quantity of data buffered by the 4G base station for transmission on the 4G carrier and/or reported as buffered by UEs for transmission on the 4G carrier. And the cell site could configured with a mapping table or other mapping data that correlates various quantities of data buffered with associated measures of capacity demand, defining a proportional relationship between quantity of data buffered and capacity demand. Thus, on at least this basis, the cell site could deem a 4G carrier that has had more data buffered to have a higher capacity demand, and the cell site could deem a 4G carrier that has had less data buffered to have a lower capacity demand.

As yet another example, the capacity demand of a 4G carrier could be defined based on the quantity of UEs connected on the 4G carrier. Here similarly, the cell site could be configured with a mapping table or other mapping data that correlates various quantities of connected UEs with associated measures of capacity demand, defining a proportional relationship between quantity of connected UEs and capacity demand. Thus, on at least this basis, the cell site could deem a 4G carrier on which more UEs are connected to have a higher capacity demand, and the cell site could deem a 4G carrier on which fewer UEs are connected to have a lower capacity demand. Other examples are possible as well.

Based on one or more of these or other such capacity-demand metrics (e.g., a weighted average of multiple such metrics), the cell site could allocate resources of the 5G carrier for use in EN-DC service of UEs served on various ones of the 4G carriers.

For instance, given a quantity of resources of the 5G carrier (perhaps per unit time) that could be allocated for use in EN-DC service, the cell site could reserve a portion of those resources respectively per 4G carrier, with the portion reserved per 4G carrier being based on the capacity demand of the 4G carrier. To facilitate this, the cell site might normalize and rank the capacity demands of the various 4G carriers so as to determine an appropriate allocation of the 5G-carrier resources per 4G carrier. In particular, the cell site could compare the capacity demands of the various 4G carriers and could allocate resources of the 5G carrier based on that comparison.

Thus, considering a scenario where there are three 4G carriers A, B, and C, the cell site might determine that (i) 4G carrier A has a very high capacity demand, justifying allocation of 50% of the resources of the 5G carrier for use to serve UEs served on 4G carrier A, (ii) 4G carrier B has a next highest capacity demand, justifying allocation of 30% of the resources of the 5G carrier for use to serve UEs served on 4G carrier B, and (iii) 4G carrier C has the next highest capacity demand, justifying allocation of 20% of the resources of the 5G carrier for use to serve UEs served on 4G carrier C. Accordingly, the cell site could reserve resources of the 5G carrier so as to allocate 50% of the resources for use in EN-DC service of UEs served on 4G carrier A, 30% of the resources for use in EN-DC service of UEs served on 4G carrier B, and 20% of the resources for use in EN-DC service of UEs served on 4G carrier C.

Other examples are of course possible as well. Further, the allocation of resources of the 5G carrier for use in EN-DC service need not total to 100% of the resources of the carrier.

As noted above, the 5G base station could be the entity that carries out this process.

To facilitate this, the 5G base station could learn of the capacity demand per 4G carrier, through inter-base station signaling with the 4G base station. For instance, the 4G base station could periodically provide the 5G base station with a report indicating one or more capacity-demand metrics per 4G carrier, autonomously or in response to queries from the 5G base station. Such a report could specify each 4G carrier by its unique carrier identifier and could indicate respectively for that 4G carrier the one or more capacity-demand metrics or the like. And provided with this capacity-demand information per 4G carrier, the 5G base station could carry out an analysis as described above to determine what extent of resources of the 5G carrier the 5G base station should reserve respectively for EN-DC service per 4G carrier (i.e., EN-DC service of UEs served respectively on each 4G carrier).

Further, the 5G base station could learn from the 4G base station which 4G carrier each UE is served on. For instance, at the time the 4G base station coordinates setup of a 5G connection for a UE to provide the UE with EN-DC service, the 4G base station could include in signaling to the 5G base station a specification of the 4G carrier's unique carrier identifier. And the 5G base station could record this data for later reference.

With this information, the 5G base station could then accordingly allocate resources of the 5G carrier for use in EN-DC service of UEs served on various ones of the 4G carriers, based on the capacity demands of the various 4G carriers. For instance, with the example above, the 5G base station may allocate up to 50% of the 5G-carrier resources for use in EN-DC service of UEs served on 4G carrier A, the 5G base station may allocate up to 30% of the 5G-carrier resources for use in EN-DC service of UEs served on 4G carrier B, and the 5G base station may allocate up to 20% of the 5G-carrier resources for use in EN-DC service of UEs served on 4G carrier C.

As further noted above, this dynamic allocation of resources of the 5G carrier could be done in the time domain, in the frequency domain, and/or in one or more other ways.

By way of example, in the time domain, the 5G base station might apply the allocation to control how many subframes per unit time the 5G base station allocates for use in EN-DC service of UEs served on various ones of the 4G carriers. For instance, the 5G base station may periodically determine based on the relative capacity demand per 4G carrier how many subframes per frame, second, or other duration, the 5G base station will use for PRB allocation to UEs served on various ones of the 4G carriers. Using the examples above, the 5G base station might thereby reserve 50% of those subframes for use to allocate PRBs to UEs served on 4G carrier A, 30% of those subframes for use to allocate PRBs to UEs served on 4G carrier B, and 20% of those subframes for use to allocate PRBs to UEs served on 4G carrier C.

As another example, in the frequency domain, the 5G base station might apply the allocation to control how many PRBs per subframe (e.g., on average) the 5G base station allocates for use in EN-DC service of UEs served on various ones of the 4G carriers. For instance, the 5G base station may periodically determine based on the capacity demand per 4G carrier how many PRBs per subframe the 5G base station will allocate to UEs served on various ones of the 4G carriers. And again using the examples above, the 5G base station might thereby reserve 50% of those PRBs for allocation to UEs served on 4G carrier A, 30% of those PRBs for allocation to UEs served on 4G carrier B, and 20% of those PRBs for allocation to UEs served on 4G carrier C.

Further, the 5G base station might perform the dynamic allocation in a combination of the time and frequency domains. For example, again using the above example, the 5G base station might reserve 50% of the 5G subframes per unit time for use to allocate PRBs to UEs served on 4G carrier A, and 5G base station may then reserve 30% of the PRBs of the remaining 5G subframes for allocation to UEs served on 4G carrier B and 20% of the PRBs of the remaining 5G subframes for allocation to UEs served on 4G carrier C.

The 5G base station could then control its allocation of resources on the 5G carrier accordingly. For instance, the resource scheduler of the 5G base station could work to ensure that the resources are allocated in the determined manner.

Figure 2:
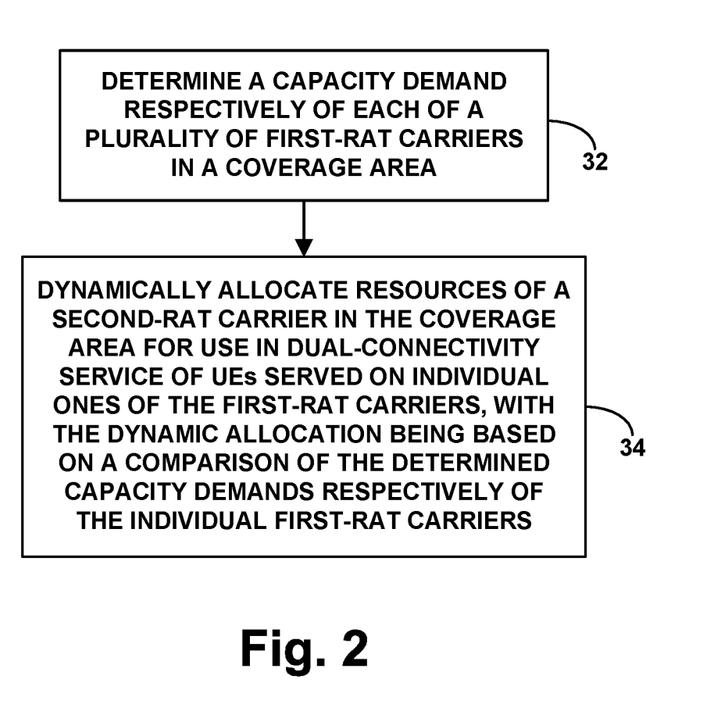
FIG. 2 is a flow chart depicting an example method in accordance with the present disclosure.

FIG. 2 is next a flow chart depicting a method operable for a wireless communication system to allocate air-interface resources, where the system provides a coverage area on a first RAT and on a second RAT, including operating in the coverage area on a plurality of carriers according to the first RAT ("first-RAT carriers") and operating in the coverage area on at least one carrier according to the second RAT ("second-RAT carrier"). As discussed above, this method could be repeated periodically to dynamically allocate air-interface resources.

As shown in FIG. 2, at block 32, the method includes the system determining a capacity demand respectively of each of the first-RAT carriers in the coverage area. And at block 34, the method includes the system dynamically allocating resources of the second-RAT carrier in the coverage area for use in dual-connectivity service (e.g., EN-DC service) of UEs served on individual ones of the first-RAT carriers, with the dynamic allocation being based on a comparison of the determined capacity demands respectively of the individual first-RAT carriers.

As discussed above, the dynamic allocation in this method could involve, based at least on a first one of the first-RAT carriers having a higher determined capacity demand than a second one of the first-RAT carriers, allocating more resources of the second-RAT carrier for use in dual-connectivity service of UEs served on the first first-RAT carrier than for use in dual-connectivity service of UEs served on the second first-RAT carrier. For instance, the dynamic allocation could involve reserving more resources of the second-RAT carrier for use in dual-connectivity service of UEs served on the first first-RAT carrier than for use in dual-connectivity service of UEs served on the second first-RAT carrier.

Further as discussed above, the act of determining the capacity demand respectively of each first-RAT carrier could be on various metrics, such data rate on the first-RAT carrier, quantity of data buffered for transmission on the first-RAT carrier, and/or quantity of UEs served on the first-RAT carrier, among other possibilities. And the dynamic allocation could be carried out in at least the time domain (e.g., allocating more time intervals of the second-RAT carrier for use in dual-connectivity service of UEs served on the first first-RAT carrier than for use in dual-connectivity service of UEs served on the second first-RAT carrier) and/or at least in the frequency domain (e.g., allocating more time physical resource blocks per unit time for use in dual-connectivity service of UEs served on the first first-RAT carrier than for use in dual-connectivity service of UEs served on the second first-RAT carrier.

Further, this method could be carried out periodically and/or in response to one or more other trigger events, to facilitate dynamic (e.g., varying) allocation of resources of the second-RAT carrier.

Figure 3:
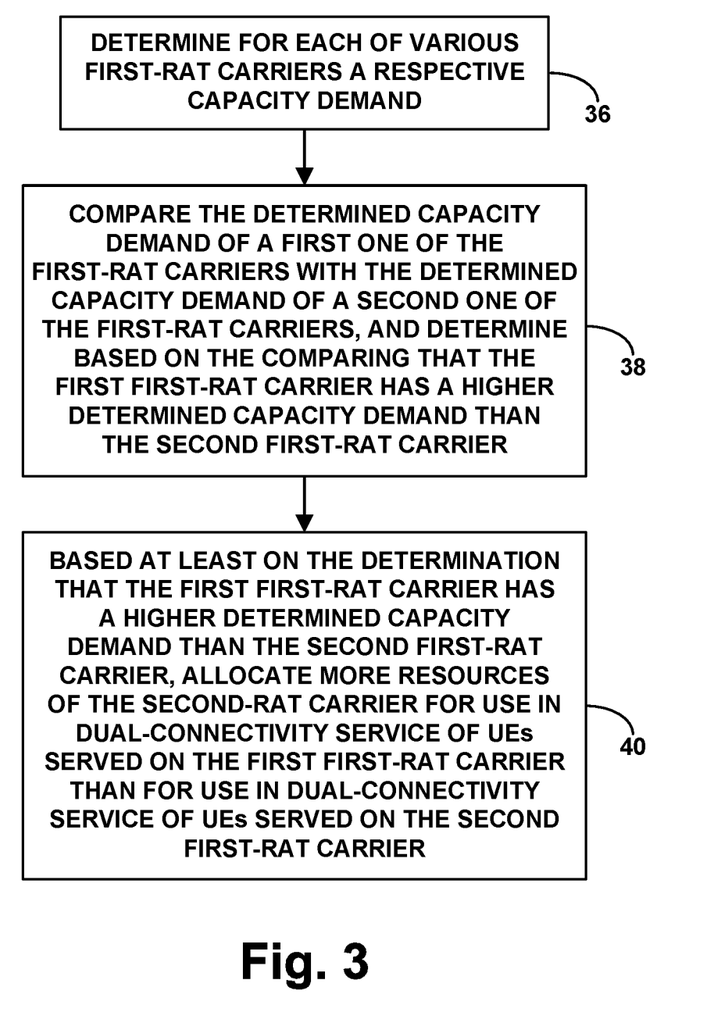
FIG. 3 is another flow chart depicting an example method in accordance with the present disclosure.

FIG. 3 is next a flow chart depicting a method operable in a cell site that provides a coverage area on a first RAT and on a second RAT, to allocate resources of a second-RAT carrier for use in dual-connectivity service of UEs served concurrently on first-RAT carriers.

As shown in FIG. 3, at block 36, the method includes determining for each first-RAT carrier a respective capacity demand. And at block 38, the method includes comparing the determined capacity demand of a first one of the first-RAT carriers with the determined capacity demand of a second one of the first-RAT carriers, and determining, based on the comparing, that the first first-RAT carrier has a higher determined capacity demand than the second first-RAT carrier. Further, at block 40, the method includes, based at least on determining that the first first-RAT carrier has a higher determined capacity demand than the second first-RAT carrier, allocating more resources of the second-RAT carrier for use in dual-connectivity service of UEs served on the first first-RAT carrier than for use in dual-connectivity service of UEs served on the second first-RAT carrier.

Here again, as discussed above, the act of allocating more resources of the second-RAT carrier for use in dual-connectivity service of UEs served on the first first-RAT carrier than for use in dual-connectivity service of UEs served on the second first-RAT carrier could involve reserving more resources of the second-RAT carrier for use in dual-connectivity service of UEs that are served on the first first-RAT carrier than for use in dual-connectivity service of UEs that are served on the second first-RAT carrier.

Further, as discussed above, the act of determining for each first-RAT carrier the respective capacity demand could involve determining for the first-RAT carrier one or more of (i) data rate of communication on the first-RAT carrier, (ii) quantity of data buffered for communication on the first-RAT carrier, and (iii) quantity of UEs connected on the first-RAT carrier. And the act of dynamically allocating the resources of the second-RAT carrier could be carried out the time domain and/or the frequency domain.

Other features discussed above could be incorporated in this context and vice versa. For instance, this method could likewise be carried out periodically and/or in response to one or more other trigger events, to facilitate dynamic (e.g., varying) allocation of resources of the second-RAT carrier.

Figure 4:
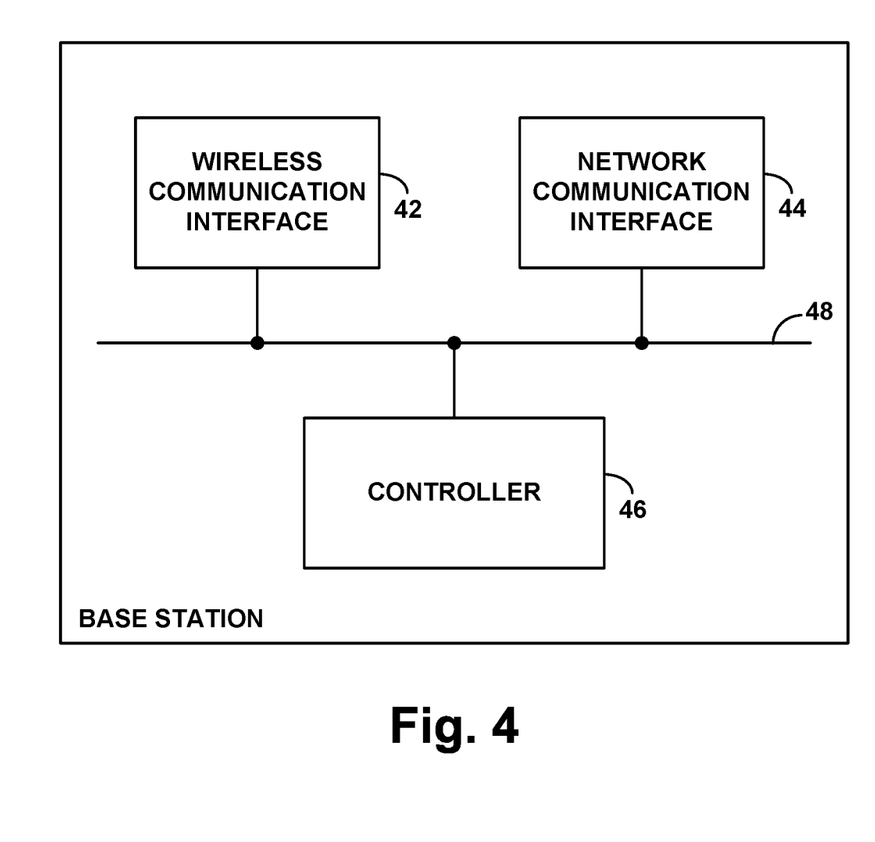
FIG. 4 is a simplified block diagram of an example base station operable in accordance with the present disclosure.

FIG. 4 is next a simplified block diagram depicting an example base station that could operate in accordance with the present disclosure. As shown, the example base station includes a wireless communication interface 42, a network communication interface 44, and a controller 46, all of which may be communicatively linked together by a system bus, network, or other connection mechanism 48.

In the context discussed above, this base station could be configured to provide wireless service according to a second RAT, operating on a second-RAT carrier in a wireless coverage area. Further, the base station could be collocated with another base that provides wireless service on a first RAT and operates on a plurality of first-RAT carriers in the wireless coverage area.

In this example base station, the wireless communication interface 42 could comprise an antenna structure, which could be tower mounted or could take other forms, and associated components such as a power amplifier and a wireless transceiver, so as to facilitate providing a coverage area defining an air interface having a downlink and an uplink, and engaging in transmission and reception of bearer and control data over the air interface in accordance with the second RAT. And the network communication interface 44 could comprise a wired or wireless interface, such as an Ethernet network communication interface, configured to support communication with other entities, such as with the other base station and various core-network entities.

Further, controller 46 could comprise a processing unit (e.g., one or more general purpose processors and/or specialized processors) programmed to cause the base station to carry out various operations such as those discussed above. For instance, the controller could comprise non-transitory data storage (e.g., one or more magnetic, optical, or flash storage components) holding program instructions executable by the processing unit to cause the base station to carry out such operations.

Exemplary embodiments have been described above. Those skilled in the art will understand, however, that changes and modifications may be made to these embodiments without departing from the true scope and spirit of the invention.

We claim:

1. A method for a wireless communication system to allocate air-interface resources, wherein the system provides a coverage area on a first radio access technology ("RAT) and on a second RAT, including operating in the coverage area on a plurality of carriers according to the first RAT ("first-RAT carriers") and operating in the coverage area on at least one carrier according to the second RAT ("second-RAT carrier"), the method comprising:

determining, by the system, a capacity demand respectively of each of the first-RAT carriers in the coverage area; and dynamically allocating, by the system, resources of the second-RAT carrier in the coverage area for use in dual-connectivity service of user equipment devices (UEs) served on individual ones of the first-RAT carriers, wherein the dynamic allocation is based on a comparison between the determined capacity demands respectively of the individual first-RAT carriers.

2. The method of claim 1, wherein the dynamic allocation comprises, based at least on a first one of the first-RAT carriers having a higher determined capacity demand than a second one of the first-RAT carriers, allocating more resources of the second-RAT carrier for use in dual-connectivity service of UEs served on the first first-RAT carrier than for use in dual-connectivity service of UEs served on the second first-RAT carrier.

3. The method of claim 2, wherein allocating more resources of the second-RAT carrier for use in dual-connectivity service of UEs served on the first first-RAT carrier than for use in dual-connectivity service of UEs served on the second first-RAT carrier comprises:

reserving more resources of the second-RAT carrier for use in dual-connectivity service of UEs served on the first first-RAT carrier than for use in dual-connectivity service of UEs served on the second first-RAT carrier.

4. The method of claim 1, wherein determining the capacity demand respectively of each first-RAT carrier is based on data rate on the first-RAT carrier.

5. The method of claim 1, wherein determining the capacity demand respectively of each first-RAT carrier is based on quantity of data buffered for transmission on the first-RAT carrier.

6. The method of claim 1, wherein the capacity demand respectively of each first-RAT carrier is based on quantity of UEs served on the first-RAT carrier.

7. The method of claim 1, wherein the dynamic allocation is carried out in at least the time domain.

8. The method of claim 7, wherein the dynamic allocation comprises, based at least on a first one of the first-RAT carriers having a higher determined capacity demand than a second one of the first-RAT carriers, allocating more time intervals of the second-RAT carrier for use in dual-connectivity service of UEs served on the first first-RAT carrier than for use in dual-connectivity service of UEs served on the second first-RAT carrier.

9. The method of claim 1, wherein the dynamic allocation is carried out in at least the frequency domain.

10. The method of claim 9, wherein the dynamic allocation comprises, based at least on a first one of the first-RAT carriers having a higher determined capacity demand than a second one of the first-RAT carriers, allocating more time physical resource blocks per unit time for use in dual-connectivity service of UEs served on the first first-RAT carrier than for use in dual-connectivity service of UEs served on the second first-RAT carrier.

11. The method of claim 1, wherein the dual-connectivity service is EUTRA-NR Dual Connectivity (EN-DC) service.

12. In a cell site that provides a coverage area on a first radio access technology (RAT) and on a second RAT, a method for allocating resources of a second-RAT carrier for use in dual-connectivity service of UEs served concurrently on first-RAT carriers, the method comprising:
 determining for each first-RAT carrier a respective capacity demand;
 comparing the determined capacity demand of a first one of the first-RAT carriers with the determined capacity demand of a second one of the first-RAT carriers, and determining, based on the comparing, that the first first-RAT carrier has a higher determined capacity demand than the second first-RAT carrier; and
 based at least on determining that the first first-RAT carrier has a higher determined capacity demand than the second first-RAT carrier, allocating more resources of the second-RAT carrier for use in dual-connectivity service of UEs served on the first first-RAT carrier than for use in dual-connectivity service of UEs served on the second first-RAT carrier.

13. The method of claim 12, wherein allocating more resources of the second-RAT carrier for use in dual-connectivity service of UEs served on the first first-RAT carrier than for use in dual-connectivity service of UEs served on the second first-RAT carrier comprises:
 reserving more resources of the second-RAT carrier for use in dual-connectivity service of UEs that are served on the first first-RAT carrier than for use in dual-connectivity service of UEs that are served on the second first-RAT carrier.

14. The method of claim 12, wherein determining for each first-RAT carrier the respective capacity demand comprises determining for the first-RAT carrier one or more of (i) data rate of communication on the first-RAT carrier, (ii) quantity of data buffered for communication on the first-RAT carrier, and (iii) quantity of UEs connected on the first-RAT carrier.

15. The method of claim 12, wherein the dynamic allocation is carried out in one or more of the time domain and the frequency domain.

16. A wireless communication system comprising:
 a first base station configured to provide wireless service in a coverage area on a plurality of carriers according to a first radio access technology ("first-RAT carriers"); and
 a second base station configured to provide wireless service in the coverage area on at least one carrier according to a second radio access technology ("second-RAT carrier")
 wherein wireless communication system includes a controller having a processing unit programmed to carry out operations including:
  determining for each first-RAT carrier a respective capacity demand,
  comparing the determined capacity demand of a first one of the first-RAT carriers with the determined capacity demand of a second one of the first-RAT carriers, and determining, based on the comparing, that the first first-RAT carrier has a higher determined capacity demand than the second first-RAT carrier; and
  based at least on determining that the first first-RAT carrier has a higher determined capacity demand than the second first-RAT carrier, allocating more resources of the second-RAT carrier for use in dual-connectivity service of UEs served on the first first-RAT carrier than for use in dual-connectivity service of UEs served on the second first-RAT carrier.

17. The wireless communication system of claim 16, wherein the controller is implemented as part of the second base station.

18. The wireless communication system of claim 16, wherein allocating more resources of the second-RAT carrier for use in dual-connectivity service of UEs served on the first first-RAT carrier than for use in dual-connectivity service of UEs served on the second first-RAT carrier comprises:
 reserving more resources of the second-RAT carrier for use in dual-connectivity service of UEs that are served on the first first-RAT carrier than for use in dual-connectivity service of UEs that are served on the second first-RAT carrier.

19. The wireless communication system of claim 16, wherein determining for each first-RAT carrier the respective capacity demand comprises determining for the first-RAT carrier one or more of (i) data rate of communication on the first-RAT carrier, (ii) quantity of data buffered for communication on the first-RAT carrier, and (iii) quantity of UEs connected on the first-RAT carrier.

20. The wireless communication system claim 16, wherein the dynamic allocation is carried out in one or more of the time domain and the frequency domain.

* * * * *